May 1, 1951     G. I. CHINN     2,550,671
CONTROL MEANS

Filed July 27, 1945            2 Sheets-Sheet 1

INVENTOR.
GEORGE I. CHINN

BY
*J. H. Church + H. E. Thibodeau*
ATTORNEYS

May 1, 1951  G. I. CHINN  2,550,671
CONTROL MEANS

Filed July 27, 1945  2 Sheets-Sheet 2

INVENTOR.
GEORGE I. CHINN
BY
J. H. Church + W. E. Thibodeau
ATTORNEYS

Patented May 1, 1951

2,550,671

UNITED STATES PATENT OFFICE 2,550,671

CONTROL MEANS

George I. Chinn, Detroit, Mich.

Application July 27, 1945, Serial No. 607,477

3 Claims. (Cl. 103—38)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to control means for variable displacement hydraulic pumps.

Although the present invention has many applications, it is particularly adapted for use in controlling the traversing of the gun turret of a military tank by means of a hydraulic power transmission incorporating a variable displacement pump. A certain type of variable displacement pump used in such transmissions has a slide block which is movable to vary the displacement of the pump, and a manually operated hydraulic valve which operates a cam to effect reciprocation of the slide block of the pump to secure the desired displacement. The pump in turn operates a hydraulic motor mounted upon the turret which, through suitable gearing, drives a pinion meshing with a large internal ring gear adjacent to the turret to rotate the latter. In order to accurately control the movement of the slide block of the pump heretofore it has been necessary to provide a complicated system of mechanical servo linkage to equalize the operation of the manually operated hydraulic control valve and stop the cam and, therefore, the slide block in the desired position.

Furthermore, in order to operate the hydraulic control valve of the pump, it is necessary that the operator apply the actuating force to the valve directly at the pump or through a mechanical linkage.

In the present invention, control of the slide block of the variable displacement pump is simplified and performed either directly at the pump, or remotely, as desired, by means of a hydraulically operated cam which in turn is regulated by means of an electromagnetic hydraulic valve and manually operated electrical control valves. Movement of the cam by fluid pressure is opposed by springs which measure the movement of the cam and control the movement thereof in accordance with the amount of control applied by the operator at the electrical control means.

It is therefore an object of the present invention to provide means for remotely controlling a variable speed displacement pump, which means are simplified in character and economical to manufacture.

Another object of the present invention is to provide means for adjusting the displacement of a variable displacement pump by means of an electromagnetic valve.

A further object is to provide control means for a variable displacement pump in which the reaction pressure generated by the pump does not interfere with the operation of the control means.

A still further object is to provide control means for a variable displacement pump in which yieldable means are provided in conjunction with the hydraulically actuated cam to oppose the movement thereof and to secure a definite movement and position of the cam for each movement and position of the manually operated control means.

Other objects and advantages of the present invention will be made more apparent as this description proceeds, particularly when considered in conjunction with the accompanying drawings, in which.

Figure 1:
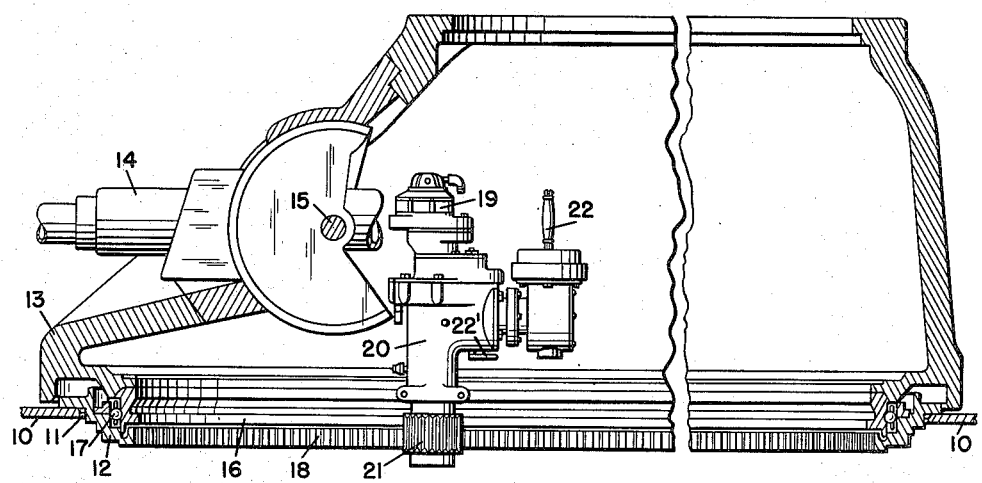
Figure 1 is an elevation, partly in section, of a portion of a tank and its gun turret equipped with my invention.

In Figure 1 is shown the top 10 of the hull of a combat military tank, having a turret opening 11 in which is fitted and secured the usual bearing race 12 for the turret. The turret is designated by the numeral 13 and carries a gun 14 mounted upon trunnions 15 for adjustment in elevation. The turret 13 carries a complementary bearing race 16 in the form of a base ring. A set of bearings 17 is inserted between the two races. The lower and inner edge of the race 12 is formed as an internal ring gear 18 for a purpose which will be presently described.

Mounted upon the turret of the tank is a constant displacement traverse motor 19 which is adapted to be actuated by means of a variable displacement pump in the manner to be hereinafter described. The motor 19 operates through a suitable gear train (not shown) in the housing 20 to drive a pinion 21 meshing with the internal ring gear 18 fixed on the hull of the tank. The gear train is adapted to be driven either hydraulically by the motor 19 or manually by the handle 22, to traverse the turret. A clutch (not shown) controlled by the handle 22' is arranged to select the desired drive.

Figure 2:
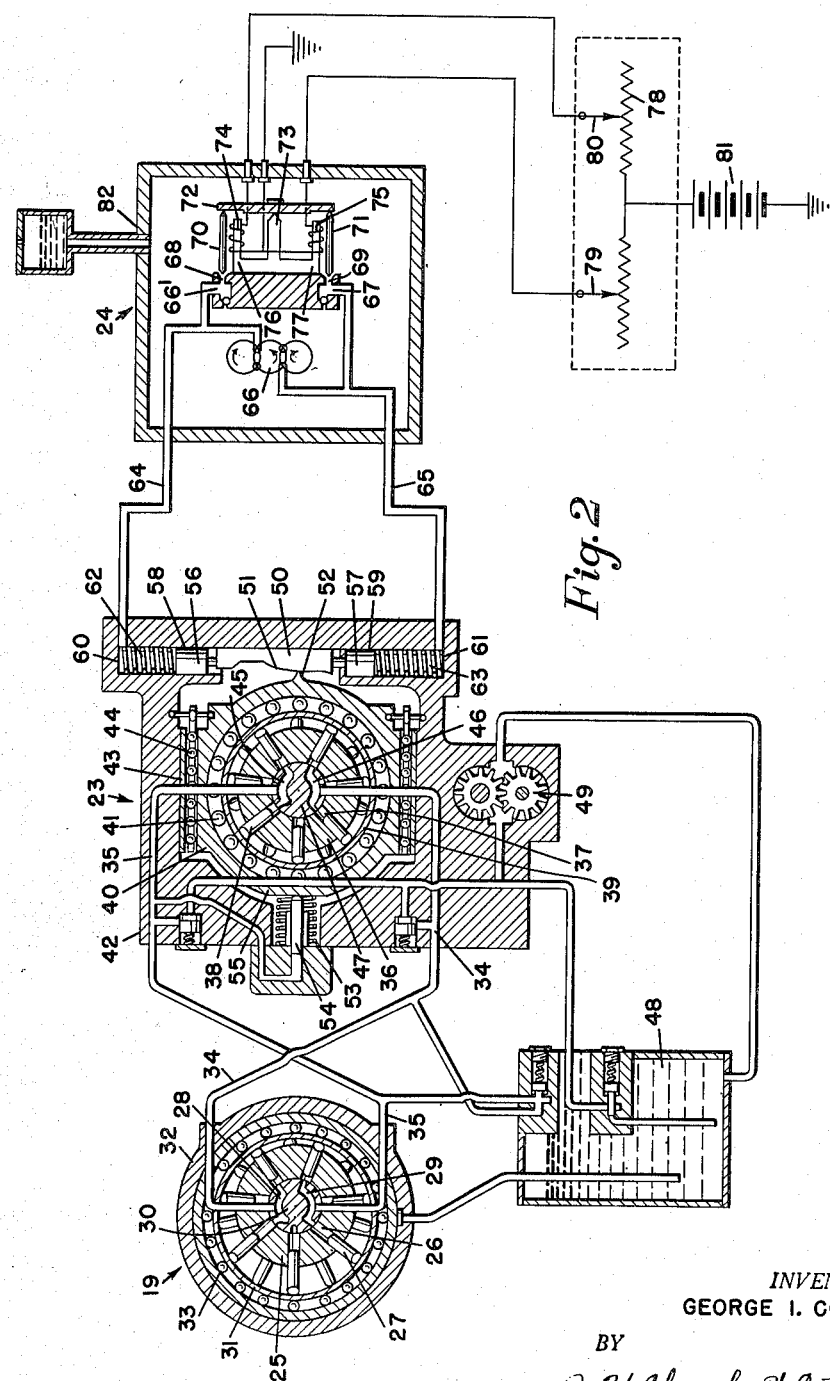
Figure 2 is a semi-diagrammatical cross sectional view of the variable displacement pump, hydraulic motor and the control means therefor.

Referring now to Figure 2, the constant displacement traverse motor 19 is adapted to be actuated by means of the variable displacement pump 23, which in turn is controlled by the electromagnetic valve 24. The motor 19 is provided with a rotating cylinder 25, formed integrally with a drive shaft (not shown) the latter being connected through suitable gearing to the pinion 21 meshing with the large internal ring gear 18. The cylinder 25 has a plurality of generally radially extending bores 26 in which are mounted small pistons 27. At their radially inner ends the bores 26 are adapted to communicate with ports 28 and 29 provided in the stationary flat valve 30. The ports 28 and 29 are crescent-shaped and the upper port 28 is adapted to communicate with the bores 26 of the cylinder as they pass through the arc of the upper port, whereas the lower port 29 is adapted to communicate with the bores as they pass through the arc of that port.

The roller bearing race 31 is rotatably mounted in the motor case 32 upon roller bearings 33. The roller bearing race 31 and the cylinder 25 are mounted in the motor case 32 at a fixed eccentricity with respect to each other to provide piston stroke.

Counter-clockwise rotation of the cylinder 25 and its driveshaft is accomplished when oil under pressure is furnished by the pump 23 through the conduit 34 to the upper port 28 of the flat valve 30. Port 28 communicates with the bores 26 to force the pistons 27 passing through the adjacent arc of the port outwardly, causing the race 31, cylinder 25 and drive shaft of the motor to be rotated in a counter-clockwise direction. Simultaneously, the pistons 27 passing through the arc of the lower port 29 discharge oil through the port 29 to the conduit 35 which returns the oil to the pump 23. The pistons 27 are maintained in contact with the roller bearing race 31 by centrifugal force plus hydraulic pressure.

The variable displacement pump 23 comprises a cylinder 36 formed integrally with a drive shaft (not shown) which is driven by a suitable electric motor. The cylinder 36 is provided with a plurality of generally radially extending bores 37 in which are mounted a plurality of pistons 38. The pistons 38 are reciprocable in the cylinders and are urged by centrifugal force into engagement with a roller bearing race 39 rotatably mounted in a slide block 40 by means of roller bearings 41. The slide block 40 is mounted for sliding movement or reciprocation within the pump casing 42 upon ways 43 provided in the casing. Ball bearings 44 are positioned between the ways 43 and the slide block 40.

The bores 37 and the cylinder 36 are adapted to communicate at their radially inner ends with ports 45 and 46 provided in a stationary flat valve 47.

When the slide block 40 is positioned in concentric relation with the cylinder 36, as shown in Figure 2, there is no reciprocation of the pistons 36 as the cylinder rotates, and consequently no oil is delivered by the pump. Displacement of the slide block 40 from its concentric relation with the cylinder and drive shaft to a position eccentric thereto results in reciprocation of the pistons 38 as the integral drive shaft and cylinder 36 rotates.

When the slide block 40 is displaced to the left from the neutral position shown in Figure 2, assuming the drive shaft and cylinder to be rotated in a counter-clockwise direction by the motor, the reciprocating pistons 38 deliver oil under pressure to the lower port 46 of the flat valve 47 as they pass through the arc of that port. The oil under pressure is delivered from the port 46 through the conduit 34 to the motor 19, effecting a rotation of the cylinder and drive shaft of the motor in the manner hereinbefore described. At the same time, exhaust oil from the motor 19 is returned through the conduit 35 to the port 45 of the flat valve 47 and is delivered to the bores 37 in the cylinder 36, as they pass through the arc of the port 45.

Although a closed fluid system is thus provided between the motor 19 and the pump 23, there is provided a hydraulic reservoir 48 and a motor-driven gear pump 49 to maintain the system completely filled with oil and to replace any leakage therefrom.

Reciprocation of the slide block 40 of the variable displacement pump is effected by means of a cam 50 provided with a cam surface 51 engageable with a cam follower 52 on the adjacent face of the slide block. The slide block 40 and its cam follower 52 are maintained in engagement with the cam 49 by means of a spring 53 and piston 54 which cooperate to maintain pressure upon the opposite side 55 of the slide block.

It will be apparent that movement of the cam 49 in a vertical direction is effective to vary the position of the slide block 40 and consequently to vary the eccentricity thereof with respect to the cylinder 36. As the aforementioned eccentricity increases, the volume of oil delivered by the variable displacement pump is increased proportionately since the stroke of the pistons 38 is greater. In a like manner the speed of the motor 19 is dependent upon the volume of oil delivered by the pump. Reversing the eccentricity of the slide block 40 with respect to the cylinder 36 reverses the flow of oil through the pump and results in reversing the direction of rotation of the motor 19. Thus it will be seen that the speed of the motor 19, and accordingly the speed of rotation of the turret 13 in either direction, is accurately controlled by varying the position of the slide block 40.

Opposite ends of the cam 50 are connected to pistons 56 and 57 which are reciprocable in cylinders 58 and 59 respectively formed in the casing 42 of the pump. Positioned between the pistons 56 and 57 and the rear walls 60 and 61 of the cylinders 58 and 59 respectively are a pair of compression springs 62 and 63, for a purpose to be more fully described hereafter.

24 is an electromagnetic valve arranged to control the flow of fluid through the conduits 64 and 65 to the cylinders 58 and 59 respectively. A gear type pump 66 (shown diagrammatically) provides oil under pressure to the conduits 64 and 65. The oil pressure supplied to the conduits 64 and 65 is varied by the oil pressure valves 66' and 67 which have ports 68 and 69 respectively controlled by plungers 70 and 71. The plungers are arranged to be reciprocated by the magnet bar 72. The magnet bar 72 is pivoted intermediate its ends upon the fulcrum 73, and is energized by the magnet coils 74 and 75 wound upon the cores 76 and 77 respectively. A variable rheostat 78 having tandem controls 79 and 80 operated in unison, provides a manual control means for varying the electrical power supplied to the magnet coils from the power source 81.

The entire mechanism within the casing 82 of the electromagnetic valve 24 operates and is submerged in oil. It will be seen that operation of the rheostat 78 increases the power supplied to one magnet coil and decreases that supplied to the other, resulting in rocking the magnet bar 72 about the fulcrum 73. In this manner one of the plungers 70 and 71 is moved toward its adjacent pressure valve and restricts the orifice thereof while the other plunger moves away from its adjacent pressure valve and opens the orifice thereof. The orifices of the pressure valves provide in effect means for by-passing the oil supplied to the conduits 64 and 65 from the gear pump 66, and regulation of the size of the orifices by the plungers 70 and 71 results in increasing the pressure to one of the cylinders 58 and 59, and simultaneously decreasing the pressure supplied to the other cylinder. In this manner controlled reciprocation of the pistons 56 and 57, and the cam 50 connected therebetween, is secured.

The compression springs 62 and 63 positioned back of the pistons 56 and 57 respectively, perform an important function. Without these springs, the differential pressure in the conduits 64 and 65 resulting from operation of the rheostat 78 would result in movement of the pistons 56 and 57, together with the cam 50, to the ends of the cylinders. Thus a maximum movement of the slide block 40 in one direction would be obtained regardless of the control applied by the operator. With the springs 62 and 63 opposing movement of the pistons 56 and 57 by the fluid pressure, a definite position of the cam 50 is obtained for each given pressure differential between the cylinders 58 and 59. The springs function to measure the movement of the pistons and to control the movement thereof in accordance with the amount of power applied at the rheostat. Since the resistance of the springs increases as they are compressed, the pistons and cam will be moved until the resistance of the spring being compressed has increased to the value of the differential pressure acting upon the pistons.

With the present construction, the electromagnetic valve 24 and the variable displacement pump 23 can be remotely controlled by means of the rheostat 78. Accordingly, the pump and electromagnetic valve may be positioned in any suitable location in the tank, and the controlling rheostat may be located in the fighting compartment of the tank turret adjacent the operator's position. This permits a more efficiently arranged fighting compartment.

An inherent characteristic of variable displacement pumps of the type illustrated and described is that movement of the slide block to an eccentric position with respect to the cylinder produces a reaction force within the pump tending to return the slide block to concentric relation with the cylinder. This reaction pressure is prevented from affecting the accuracy of the control of the pump by positioning the cam 50 and the associated pistons and cylinders substantially normal to the direction of movement of the slide block. With this construction the reaction pressure of the slide block is absorbed through the cam 50 by the casing 42 of the pump in one direction and by the spring 53 and piston 54 in the opposite direction. Inasmuch as the cam surface 51 of the cam 50 is designed to be self-locking with respect to the cam follower 52, the reaction pressure is ineffective to move the cam 50 in either direction.

From the foregoing it will be apparent that I have provided control means for variable displacement pumps, for use in turret traversing mechanism of tanks and also in other applications, in which the control may be remotely located from the pump and in which the control mechanism is greatly simplified over conventional construction, yet at the same time achieves an accurate and precise control thereof.

Figure 3:
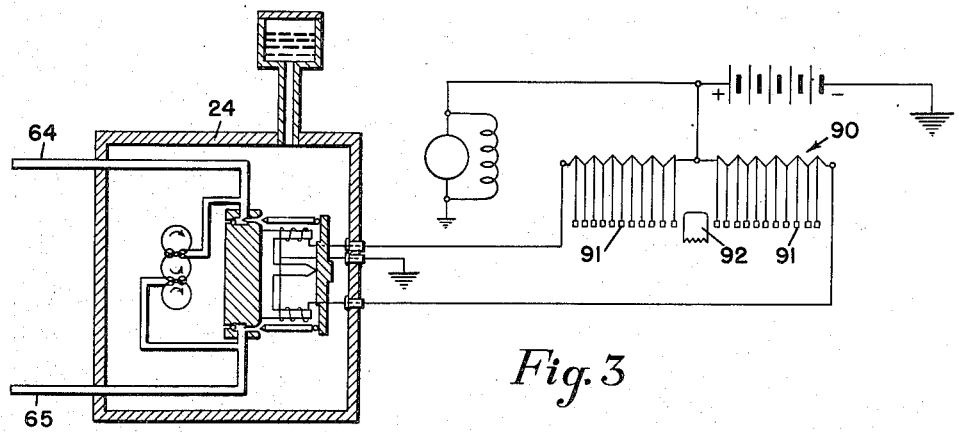
Figure 3 is a fragmentary semi-diagrammatical cross-sectional view of a modification.

A slight modification of the control means for my invention is shown in Figure 3. For simplicity, the variable displacement pump, which is identical with that shown in Figure 2, is omitted. The electro-magnetic valve 24 is also identical in construction. The modification resides in the provision of a silverstat control 90 in place of the rheostat shown in Figure 2. The silverstat control comprises a plurality of contacts 91 positioned on opposite sides of a movable control member 92. Movement of the control member 92 in either direction effects a closing of a number of the silverstat contacts 91, resulting in shorting or shunting a portion thereof. This is effective to operate the pressure valves contained in the magnetic valve 24 and to produce a pressure differential between the lines 64 and 65.

The modified control means shown in Figure 3 can also be used to provide azimuth stabilization of the gun turret, and to thereby automatically compensate for yawing of the tank. When used in this manner the silverstat controls 91 are suspended vertically and the control member 92 takes the form of a gyroscope. Movement of the tank from its normal direction results in a precession of the gyroscope, which in turn actuates and closes the silverstat contacts on one side of the silverstat control 90. Through the magnetic valve and the variable displacement pump, this gyroscopic control is effective to maintain the turret stabilized in azimuth. When used as an azimuth stabilizer it will of course be necessary to provide additional means for the necessary traversing of the gun turret to aim the gun and follow the target.

Although I have shown and described certain embodiments of the invention, it will be understood that I do not wish to be limited to the exact construction shown and described, but that various changes and modifications may be made without departing from the spirit and scope of my invention as defined in the appended claims.

What I claim is:

1. Control mechanism for a variable displacement pump of the type having a slide block which is movable to vary the displacement of the pump and delivery therefrom of fluid under pressure, comprising a reciprocative movable cam for moving said slide block, a pair of pistons connected to respective opposite ends of said cam for moving the latter, a cylinder for each of said pistons, a source of control fluid pressure independent of said pump, a control fluid circuit independent of the first mentioned fluid and having a pair of conduits establishing fluid connection between said source and respective ones of said cylinders whereby said control fluid pressure acts on each of said pistons, valve means in said conduits between said source and respective ones of said cylinders for selectively varying the intensity of said control fluid pressure in said conduits with respect to each of said cylinders, and a pair of springs in compressible engagement with respective ones of said pistons and yieldably opposing movement in either direction of said cam by said control fluid pressure.

2. Control mechanism for a variable displacement pump of the type having a slide block which is movable to vary the displacement of the pump and delivery therefrom of fluid under pressure, comprising a movable cam for moving said slide block, said cam being movably reciprocative in a direction substantially normal to the direction of movement of said slide block, a pair of pistons connected to respective opposite ends of said cam, cylinders for said pistons, a source of control fluid pressure independent of said pump, a control fluid circuit independent of the first mentioned fluid and having a pair of conduits establishing fluid connection between said source and respective ones of said cylinders whereby said control fluid pressure in said conduits acts on said pistons, valve means in each of said conduits for selectively varying the intensity of said control fluid pressure therein with respect to each of said cylinders, and a compression spring in each of said cylinders in compressible engagement with the respective piston therein yieldably opposing movement of said cam in either direction by said control fluid pressure.

3. Control mechanism of the character described for controllably moving a reciprocably movable object having a cam follower thereon comprising, in combination, a reciprocably movable cam having a side cam surface thereon constantly engageable by said cam follower, a pair of pistons connected to respective opposite ends of said cam for movement of the latter in either direction, cylinders for said pistons, a source of control fluid pressure, a pair of conduits establishing fluid connection between said source and respective ones of said cylinders whereby said pistons therein are acted upon by said control fluid pressure, a pair of simultaneously operable pressure valves between said source and respective ones of said cylinders for selectively varying the intensity and relative differential of said control fluid pressure in said conduits with respect to each of said cylinders, and a compression spring in each of said cylinders in compressible engagement with the respective piston therein yieldably opposing by compression any movement of said cam in either direction as a result of a differential control fluid pressure acting on said pistons.

GEORGE I. CHINN.

REFERENCES CITED

The following references are of record in the file of this patent:

UNITED STATES PATENTS

| Number | Name | Date |
|---|---|---|
| 2,214,552 | Ferris | Sept. 10, 1940 |
| 2,239,882 | Davis | Apr. 29, 1941 |
| 2,302,922 | Tucker | Nov. 24, 1942 |
| 2,360,526 | Staples | Oct. 17, 1944 |
| 2,381,162 | Taylor | Aug. 7, 1945 |